United States Patent
Aurongzeb et al.

(10) Patent No.: US 8,971,968 B2
(45) Date of Patent: Mar. 3, 2015

(54) SYSTEM AND METHOD FOR CONTEXT AWARE USABILITY MANAGEMENT OF HUMAN MACHINE INTERFACES

(71) Applicant: Dell Products, LP, Round Rock, TX (US)

(72) Inventors: Deeder M. Aurongzeb, Round Rock, TX (US); Erin K. Walline, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 13/744,957

(22) Filed: Jan. 18, 2013

(65) Prior Publication Data

US 2014/0206416 A1    Jul. 24, 2014

(51) Int. Cl.
H04M 1/00 (2006.01)
G06F 3/041 (2006.01)
H04R 29/00 (2006.01)
H04M 1/02 (2006.01)
G06F 3/0484 (2013.01)

(52) U.S. Cl.
CPC ......... H04R 29/008 (2013.01); H04M 1/0266 (2013.01); *G06F 3/0484* (2013.01); *G09G 2340/145* (2013.01); *G06F 3/0418* (2013.01); *G09G 2340/045* (2013.01); *G06F 3/04842* (2013.01); *H04R 2203/12* (2013.01); *H04R 2499/11* (2013.01)
USPC ............................. 455/566; 345/173; 345/178

(58) Field of Classification Search
CPC .................... G09G 2340/14; G09G 2340/145; G09G 2340/045; G06F 3/0484; G06F 3/0488; G06F 3/04897; G06F 3/0482
USPC .......................................................... 455/566
See application file for complete search history.

(56) References Cited

U.S. PATENT DOCUMENTS

| | | | |
|---|---|---|---|
| 6,124,845 A * | 9/2000 | Toda et al. ..................... | 345/157 |
| 6,351,705 B1 * | 2/2002 | Yoshioka ....................... | 701/538 |
| 7,517,821 B2 | 4/2009 | Terasawa et al. | |
| 8,570,292 B2 * | 10/2013 | Longe et al. .................. | 345/173 |
| 2005/0048273 A1 | 3/2005 | Ryan | |
| 2005/0169527 A1 * | 8/2005 | Longe et al. .................. | 382/177 |
| 2006/0164382 A1 * | 7/2006 | Kulas et al. ................... | 345/156 |
| 2006/0227115 A1 * | 10/2006 | Fry ................................ | 345/173 |
| 2008/0259040 A1 * | 10/2008 | Ording et al. ................. | 345/173 |
| 2009/0228828 A1 * | 9/2009 | Beatty et al. .................. | 715/786 |
| 2010/0127189 A1 | 5/2010 | Boyarsky et al. | |
| 2010/0220064 A1 * | 9/2010 | Griffin et al. ................. | 345/173 |
| 2011/0256019 A1 | 10/2011 | Gruen et al. | |
| 2012/0306768 A1 * | 12/2012 | Bailey .......................... | 345/173 |
| 2013/0254657 A1 * | 9/2013 | Huang .......................... | 715/268 |

* cited by examiner

*Primary Examiner* — Duc M Nguyen
(74) *Attorney, Agent, or Firm* — Larson Newman, LLP

(57) ABSTRACT

A method includes determining by a sensor of a mobile device that a first ambient sound level represents a quiet context for the mobile device, providing a audio signal to a speaker of the mobile device in response to determining that the first ambient sound level represents a quiet context, determining, by the sensor, that a second ambient sound level represents a first noisy context for the mobile device, wherein the second ambient sound level is louder than the first ambient sound level, modifying the audio signal into a beam forming audio signal in response to determining that the second ambient sound level represents the first noisy context, and providing the beam forming audio signal to the speaker.

18 Claims, 6 Drawing Sheets

Normal

400

Enhanced

Normal

500

Beam Forming

520

600      Normal

610      Enhanced

620      Hover

SYSTEM AND METHOD FOR CONTEXT AWARE USABILITY MANAGEMENT OF HUMAN MACHINE INTERFACES

FIELD OF THE DISCLOSURE

This disclosure generally relates to information handling systems, and more particularly to providing context aware usability management of human machine interfaces.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
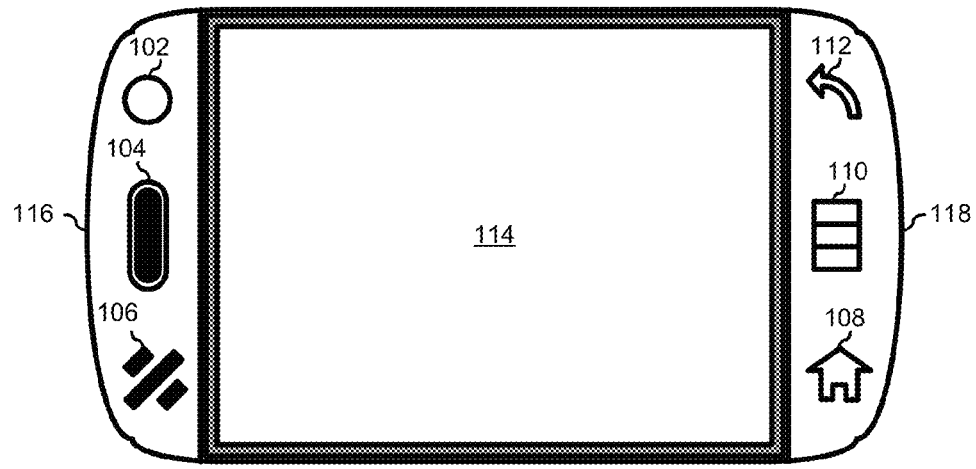
FIG. 1 is illustrates a mobile device according to an embodiment of the present disclosure.

FIG. 1 illustrates a mobile device 100, including a camera 102, a microphone 104, a speaker 106, a home button 108, a menu button 110, a back button 112, and a touch screen 114. As illustrated, mobile device 100 is a tablet computing device. In other embodiments, mobile device 100 may be a laptop computer, a commercial scanning device, a smartphone, another mobile electronic device, or a combination thereof. Mobile device 100 operates to provide one or more human machine interfaces to receive inputs from a user, and to provide outputs to the user. As such, mobile device 100 includes several input devices, including camera 102, microphone 104, home button 108, menu button 110, back button 112, and touch screen 114. Camera 102 represents a photosensitive device integrated into mobile device 100 and operable to record photographic images and full motion video images, to sense ambient light and color levels, and to capture other visual information in the field of view of the camera. Microphone 104 represents a sound sensitive device integrated into mobile device 100 and operable to record sounds and audio tracks for full motion video images, to sense ambient sound levels, and to capture other sound information in the area of the microphone. In a particular embodiment, mobile device 100 includes one or more additional cameras and microphones placed at different locations on the mobile device, such as on the back side of the mobile device, as needed or desired.

Buttons 108, 110, and 112, and touch screen 114 represent user input devices that are operable to receive input from a user of mobile device 100. In the case of buttons 108, 110, and 112, the functions associated with the user inputs to each button are predetermined and are consistent across multiple modes of operation of mobile device 100. For example, home button 108 can operate to cancel functions that are being performed by mobile device 100, and to display a home page for the mobile device. Menu button 110 can operate to display a menu associated with a currently operating function of mobile device 100. Back button 112 can operate to display a previously operating function or previously shown display on touch screen 114. Touch screen 114 represents a dual purpose element of mobile device 100, providing a primary visual output device of the mobile device and providing a touch based input device to the mobile device. As a touch based input device, touch screen 114 associates locations on the touch screen with different inputs, which, when depressed by a user, operate to direct the functions of mobile device 100. For example, from a home screen, touching a location that is displaying an icon can operate to launch an application associated with the icon. In another example, in a text entry application, a location associated with alpha-numeric inputs represented by a keyboard, touching a location that is displaying a particular alphanumeric character can operate to input the character into the text. In a particular embodiment, mobile device 100 includes one or more additional input devices 116 disposed within a case of the mobile device, such as a vibration sensor, an orientation sensor, a rotation sensor, an acceleration sensor, a pressure sensor, a geographic positioning sensor such as a Global Positioning System (GPS) sensor, a free-fall sensor, another input device, or a combination thereof, as needed or desired. Output devices on mobile device 100 include speaker 106 and touch screen 114. Mobile device 100 includes one or more additional output devices 118 that are disposed within in the case of the mobile device, such as an auxiliary display on the back side of the mobile device, one or more additional speaker, a vibrator, another output device, or a combination thereof, as needed or desired.

In a particular embodiment, mobile device 100 operates to receive inputs from the input devices in order to determine a context within which the mobile device is operating, and to modify the behavior of the output devices in response to the context. Here, the input devices can be used to recognize various ambient conditions. For example, camera 102 can detect that the image in the field of view is constantly changing and mobile device 100 can thus infer that the mobile device is in motion. Here, one or more of the additional input devices 116, such as a vibration sensor, an orientation sensor, a rotation sensor, an acceleration sensor, or a geographic positioning sensor can provide additional context information related to the motion of mobile device 100. In another example, camera 102 can determine an ambient light level. Further, microphone 104 can detect an ambient noise level. Moreover one or more of the additional input devices 116, such as a geographic positioning sensor can provide additional context information related to the location of mobile device 100.

In response to the various contextual information received from the input devices or embedded sensors, mobile device 100 modifies the behavior of the output devices in order to improve a user's experience in interacting with the mobile device. For example, when the context for mobile device 100 is determined to be one of chaotic motion, such as when a user is walking or riding along a bumpy road, the mobile device can perform adjustments to the image displayed on touch screen 114, so as to simplify and un-clutter the image. Here, various non-functional aspects of the display can be eliminated, such as status bar information or unused icons. Additionally, more relevant portions of the remaining display image can be enlarged to more fully fill touch screen 114. For example, only the content of a web browser can be displayed, and various search bars, scroll bars, menus, and the like, can be eliminated from the image.

Further, various display and input enhancements can be applied that compensate for a less steady hand when mobile device 100 is in motion. For example, when touch screen 114 displays a keypad, and mobile device 100 is in motion, a touch averaging can be applied to more accurately gage the user's intent when entering text to a moving mobile device. Thus, when a user intends to select a character, their hand may move between the intended character and an adjacent character. Here, additional pixels of touch screen 114 can be ascribed to each character, as described below, to ensure that the user's intent is more accurately determined. In addition, mobile device 100 can average an amount of time spent in each area of touch screen 114 to determine which character is selected for a longer duration, thereby inferring the user's intent. In a further step, if the averaging is unavailing to determine the user's intent, the screen image can be modified to display the alternate characters in a much larger field of touch panel 114, thereby giving the user a larger target to select from.

Additionally, when the context for mobile device 100 is determined to be one high brightness or low brightness, the mobile device can perform adjustments to the image displayed on touch screen 114, so as to either brighten or darken the image. Further, mobile device 100 can adapt the colors of the display to provide improved image contrast. Further, when the ambient noise level is determined to be high, mobile device 100 can perform various audio enhancements such as beam forming, noise cancellation, and white noise generation. When the location for mobile device 100 is determined, the mobile device can also add features and functionality that is tailored to the location. For example, a language pack for mobile device 100 can automatically be downloaded when the mobile device determines that it is in a different country.

Figure 2:
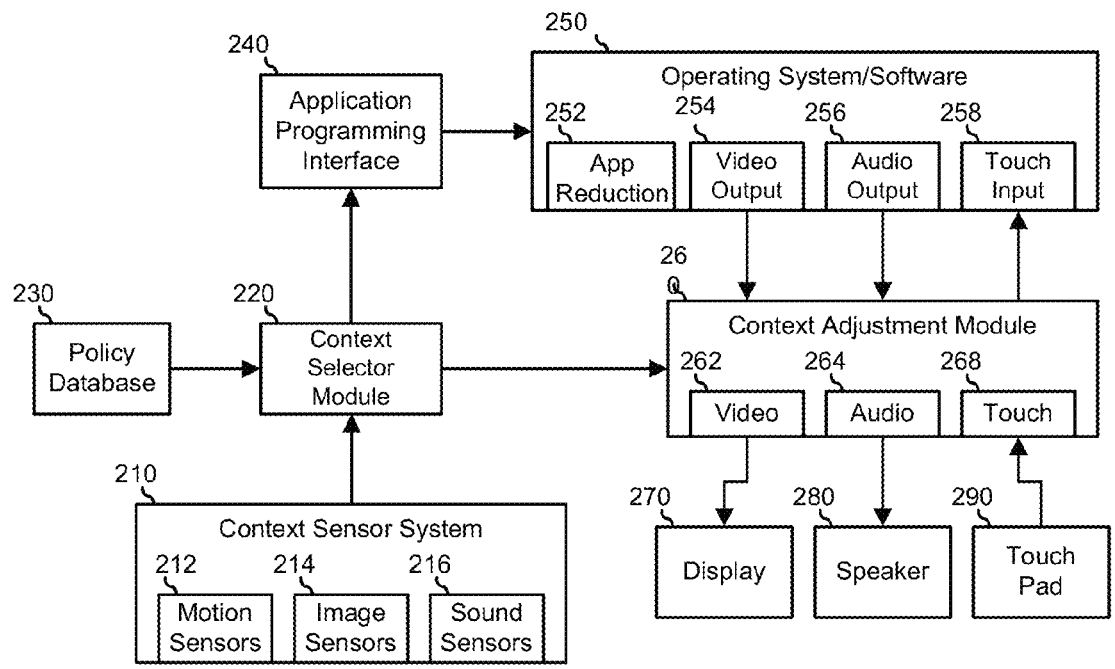
FIG. 2 is a block diagram illustrating a mobile device according to another embodiment of the present disclosure.

FIG. 2 illustrates a mobile device 200 similar to mobile device 100 and including a context sensor system 210, a context selector module 220, a policy database 230, one or more application programming interfaces (APIs) 240, an operating system (OS)/software stack 250, a context adjustment module 260, a display, 270, a speaker 280, and a touch pad 290. Context sensor system 210 includes motion sensors 212, image sensors 214, and sound sensor 216. Motion sensors 212 include one or more sensor devices that detect and characterize the motion of mobile device 200, such as a vibration sensor, an orientation sensor, a rotation sensor, an acceleration sensor, a pressure sensor, a geographic positioning sensor, a free-fall sensor, another input device, or a combination thereof. Image sensors 214 include one or more sensor devices that detect and characterize the visible surroundings of mobile device 200, such as a camera, a light or color sensor, a photocell, another image sensor, or a combination thereof. Sound sensors 216 include one or more sensor devices that detect and characterize the audio surroundings of mobile device 200, such as a microphone, a pressure sensor, another sound sensor, or a combination thereof.

Context selector module 220 operates to receive context information from context sensor system 210 and to direct the adjustments to the output devices of mobile system 200. In particular, context selector module 220 receives the information from the sensors 212, 214, and 216, and, based upon various threshold levels for each sensor, determines whether or not an output is to be adjusted, and if so, by how much. Context selector module 220 accesses policy database 230 to determine the threshold levels, which output to adjust, and the degree to which the output is to be adjusted. As such, policy database 230 includes various policy settings for determining the sensor thresholds for each sensor 212, 214, and 216, the output adjustments associated with each sensor and each threshold, and the degree to which the output is to be adjusted.

TABLE 1

Policy Database

| Policy | Motion | Image | Sound | Adjustment |
|---|---|---|---|---|
| Default | <10% | 30-70% | <20% | None |
| Motion | 10-40% | — | — | Screen Un-Clutter |
|  | 40-80% | — | — | Image Enhancement |
|  | 80-100% | — | — | Keypad Enhancement |
| Brightness | — | 0-30% | — | Dim and Contrast |
|  | — | 30-70% | — | None |
|  | — | 70-100% | — | Brighten and Contrast |
| Sound | — | — | 0-20% | None |
|  | — | — | 20-70% | Beam Forming |
|  | — | — | 70-100% | Noise Cancelling |

Table 1 illustrates an embodiment of policy database 230. Here, policy database 230 includes a default policy, motion based policies, brightness based policies, and sound based policies. The default policy is defined in terms of a nominal value for motion sensors 212 that indicate that the motion of mobile device 200 is less than 10%, nominal values for image sensors 214 that indicate that the brightness is in a midrange of between 30 and 70%, and nominal values for sound sensors 216 that indicate that the ambient sound is less than 20%. Here, the policy indicates that no adjustments are to be made to the outputs when sensors 212, 214, and 216 are within these values. The motion based polices are defined in terms of value ranges for motion sensors 212 that are outside of the nominal range. Here, when motion sensors 212 indicate that the motion of mobile device 200 is between 10 and 40%, the mobile device can perform screen un-cluttering, when the sensors indicate that the motion is between 40 and 80%, the mobile device can also perform image enhancement, and when the sensors indicate that the motion is between 80 and 100%, the mobile device can further perform keypad enhancement. Brightness and sound policies are similarly defined in policy database 230 as indicated.

It will be understood that additional polices can be provided, and that the threshold levels are exemplary values. Further, the skilled artisan will recognize that different polices that are based upon various combinations of sensor inputs are possible. Moreover, percentages are used herein to describe the sensor inputs. However, other measures of sensor input can be utilized, as needed or desired. For example, sound levels can be defined in terms of decibels, brightness can be defined in terms of candle power, motion can be defined in terms of a g-force reading from an accelerometer, or other definitions can be utilized. In a particular embodiment, policy database 230 can be accessed via a user interface that allows a user of mobile device 200 to add, remove, change, or update policies, and to create custom policies.

Context selector module 220 operates to direct the adjustments to the output devices of mobile system 200 via two different methods. In the first method, context selector module 220 operates to provide selected context outputs to API 240 which utilizes hooks into OS/software stack 250 to manipulate the behavior of the outputs at the OS or application software level. OS/software stack 250 includes an application reduction module 252, a video output 254, an audio output 256, and a touch pad input 258. Here, OS/software stack 250 provides hooks to API 240 that are used to modify the output behavior of the OS/software stack. In a particular embodiment, API 240 uses hooks into OS/software stack 250 to access application reduction module 252 to close a program that running in the background on mobile device 200, or to shut down a thread associated with a program. In this way, the image displayed on display 270 is un-cluttered. For example, where a time/date dashboard is displayed in the default operation mode, application reduction module 252 can shut down the time/date dashboard application to un-clutter the display in one or more of the motion based operation modes.

In another embodiment, API 240 uses hooks into OS/software stack to access core functions of the OS or the software running on mobile device 200. For example, where OS/software stack operates to display a status bar in the default operation mode, API 240 can direct the OS/software stack to keep the status bar running, but to remove the status bar to further un-clutter the display in one or more of the motion based operation modes. In another embodiment, API 240 uses hooks into one or more of video output 254, audio output 256 and touch pad input 258 to directly change the outputs. For example, API 240 can directly manipulate contrast and brightness settings of video output 254 to implement one or more of the brightness operation modes, and can directly manipulate sound shaping settings of audio output 256 to implement one or more of the sound operation modes. Similarly, API 240 can direct touch pad input 258 to implement various key pad enhancements, as needed or desired. The skilled artisan will recognize that, although API 240 is described as a single element of mobile device 200, one or more additional APIs can be present in the mobile device, each being tailored the specific needs or capabilities of different OS features or software programs operating on the mobile device.

Figure 3:
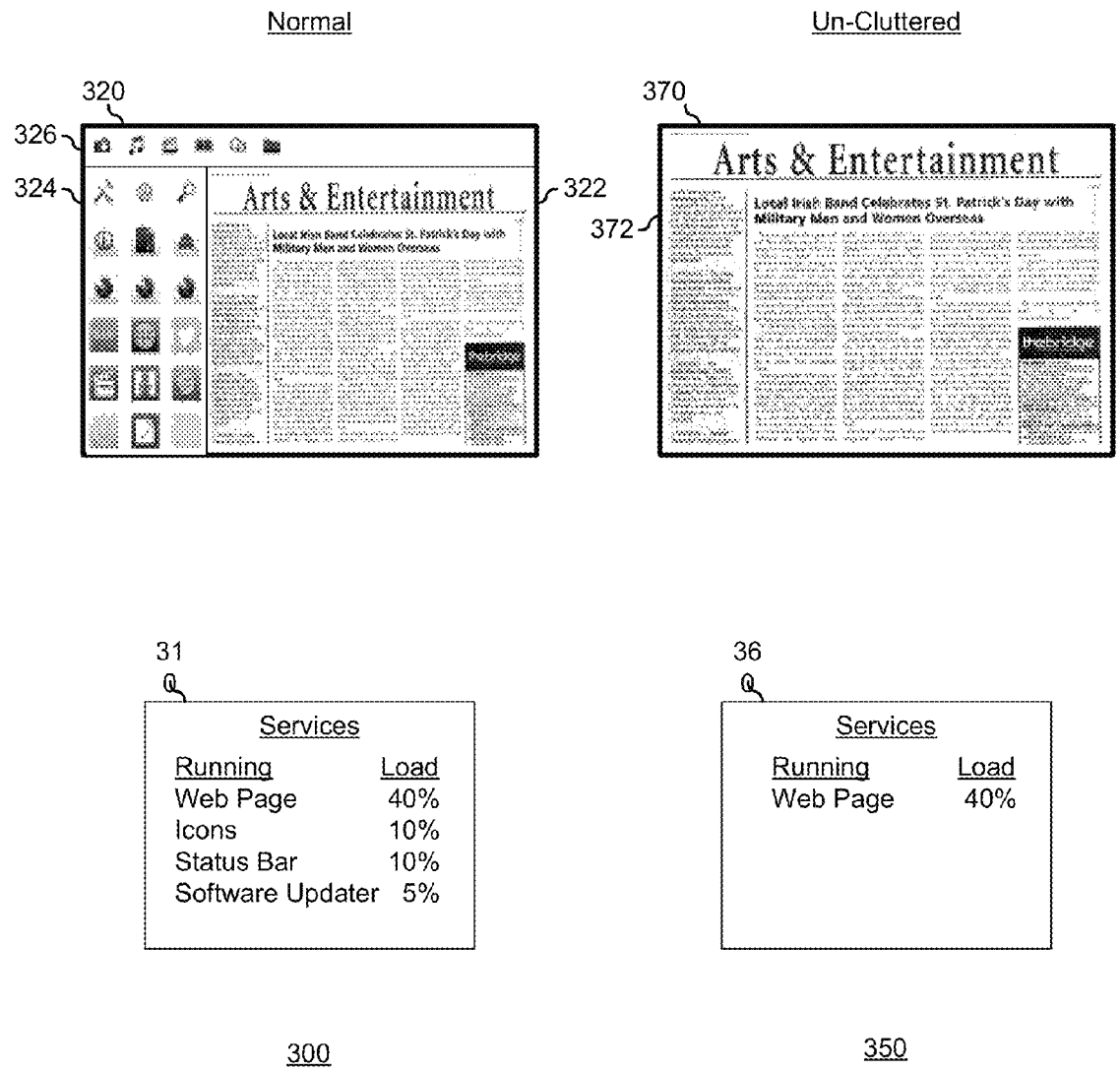
FIG. 3 illustrates a method of screen un-cluttering in the mobile device of FIG. 2.

FIG. 3 illustrates various screen un-cluttering methods provided by context selector module 220 via API 240. A normal operation mode 300 includes a normal mode services list 310 and a normal mode display 320. Here, in the normal operating mode, services list 310 shows that mobile device 200 is running a web application, an icon application, a status bar application, and a software updater. Normal mode display 320 shows a web page 322 associated with the web application, an icon display 324 associated with the icon application, and a status bar display associated with the status bar application. Here, the software updater is running in the background on mobile device 200. When, based upon the direction of context selector module 220, mobile device 200 enters a motion based operation mode, API 240 directs OS/software stack 250 to enter an un-cluttered operation mode 350 including an un-cluttered mode services list 360 and an uncluttered mode display 370. Here, API 240 has directed application reduction module 252 to shut down the icon program, the status bar program, and the software updater. In response, uncluttered mode display 370 shows only web page 372 associated with the web application. Here web page 372 is also resized with respect to web page 322, in order to more fully utilize the screen area of the display. In another embodiment, web page 372 is unchanged from web page 322.

In the second method of directing the adjustments to the output devices, context selector module 220 provide the selected context outputs to context adjuster module 260 which directly manipulates the behavior of the outputs from OS/software stack 250. Context adjuster module 260 includes a video adjuster module 262, an audio adjuster module 264, and a touch pad adjuster module 266. Here, video adjuster module 262 operates in line between video output module 254 and display 270 to perform various context based adjustments to the displayed image. For example, where video output module 254 provides an image display for an application in the default operation mode, video adjuster module 262 can resize and reposition the image, enhancing the actual image displayed on display 270 to include only a most commonly used portion of the original image in one or more of the motion based operation modes.

Figure 4:
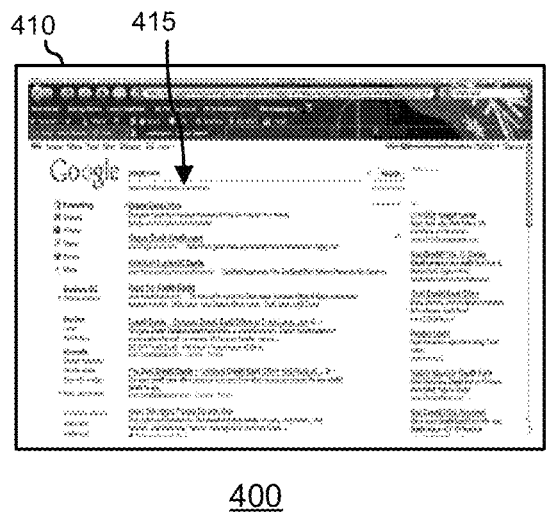
FIG. 4 illustrates a method of screen enhancing in the mobile device of FIG. 2.
Figure 4:
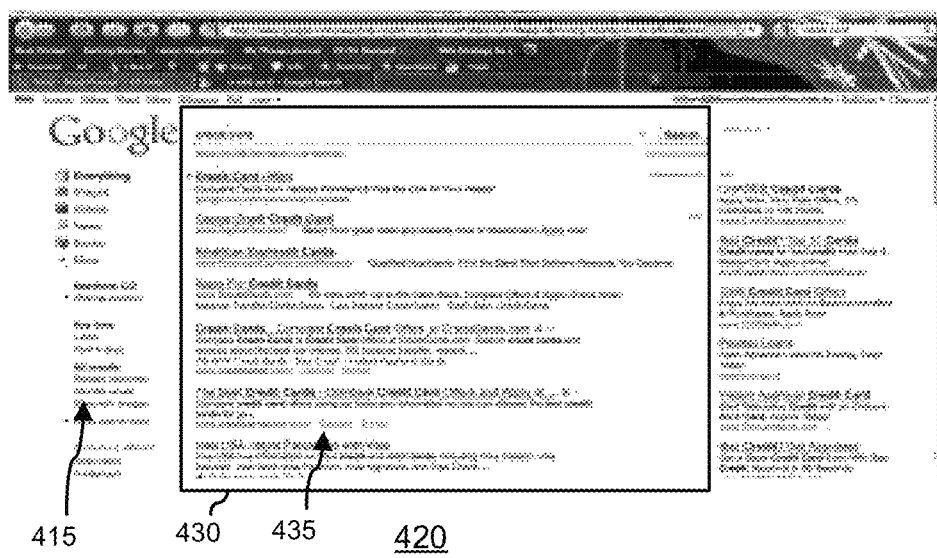

FIG. 4 illustrates a screen enhancing method provided by context adjuster module 260 via video adjustment module 262. A normal operation mode 400 includes a normal mode display 410 showing a web page 415. When, based upon the direction of context selector module 220, mobile device 200 enters a motion based operation mode, context adjuster module 260 directs video adjuster module 462 to enter an enhanced operation mode 420 including an enhanced mode display 430 showing an enhanced web page 435. Note that here, video output 254 still provides web page 415 as an output, but video enhancement module 262 resizes and repositions the web page so that a most commonly used portion of the web page is displayed.

Returning to FIG. 2, audio adjuster module 264 operates in line between audio output module 256 and speaker 280 to perform various context based adjustments to the sound from the speaker. For example, where audio output module 256 provides a sound signal in the default operation mode, audio adjuster module 264 can perform various beam forming techniques or noise cancellation functions, or add white noise to the signal provided to speaker 280 in one or more of the sound based operation modes.

Figure 5:
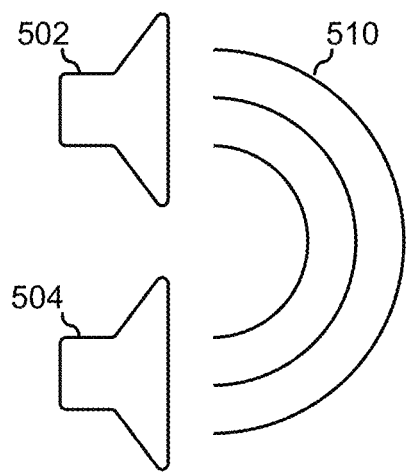
FIG. 5 illustrates a method of beam formation in the mobile device of FIG. 2.
Figure 5:
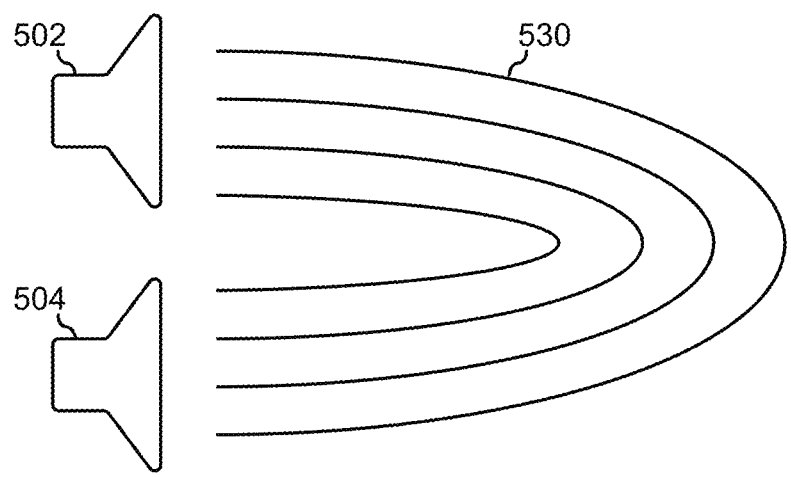

FIG. 5 illustrates a beam forming method provided by context adjuster module 260 via audio adjustment module 264. A normal operation mode 500 includes a normal sound signal 510 provided by a pair of speaker 502 and 504. When, based upon the direction of context selector module 220, mobile device 200 enters a sound based operation mode, context adjuster module 260 directs audio adjuster module 464 to enter an enhanced operation mode 520 where a beamed sound signal 530 is provided by speakers 502 and 504. The skilled artisan will understand that audio beam forming can utilize more than two speakers. In another embodiment, speakers 502 and 504 can provide noise cancelling or white noise generation in enhanced operation mode 520.

Returning again to FIG. 2, touch pad adjuster module 266 operates in line between touch pad 290 and touch pad input 258 to perform various context based adjustments to the operation of the touch pad. For example, working in conjunction with video adjuster module 262, touch pad adjuster module 626 provides enhancements to a keypad function. For example, when mobile device 200 is in a normal operation mode, a user selects a character from a keypad. However, when mobile device 200 is in a motion based operation mode, touch pad adjuster 262 can average an amount of time that a touch is above various characters of the keypad to determine the user's intent, or can enhance one or more key entry pads to make it easier to select the intended character.

Figure 6:
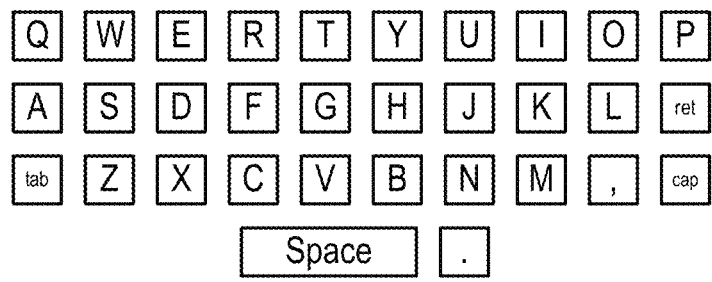
FIG. 6 illustrates a method of keypad enhancement in the mobile device of FIG. 2.
Figure 6:
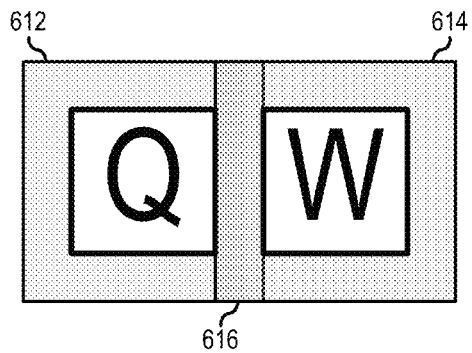
Figure 6:
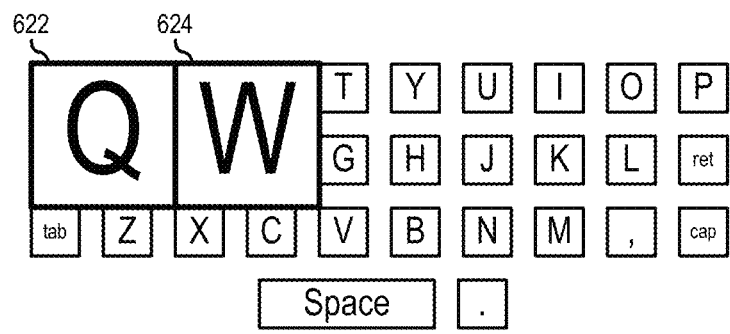

FIG. 6 illustrates keypad display provided by video output 252 in a normal operation mode 600. When, based upon the direction of context selector module 220, mobile device 200 enters a motion based operation mode, context adjuster module 260 directs touch pad adjuster module 266 to operate in an enhanced operation mode 610 where average the touch durations over adjacent keys are determine in order to determine a user's intentions. In a particular embodiment, a border area 612 around a first character, and a similar border area 614 surrounds a second character. Here, the border areas of adjacent characters overlap 616. Here, when a touch is sensed within the first character and also within the second character within a short duration of time, the time of the touch within each character can be measured, or if the touch oscillates between characters, the time within each character can be averaged. In this way, the character that has either the longest touch, or the longest average touch can be inferred to be the intended character. If the durations within each character are very close to being equal, context selector module 220 selects a hover mode of operation 620 and directs video adjuster module 462 to enter a hover operation mode 620 where the image for the characters 622 and 624 are enlarged in order to make it easier for the user to select the intended character.

Figure 7:
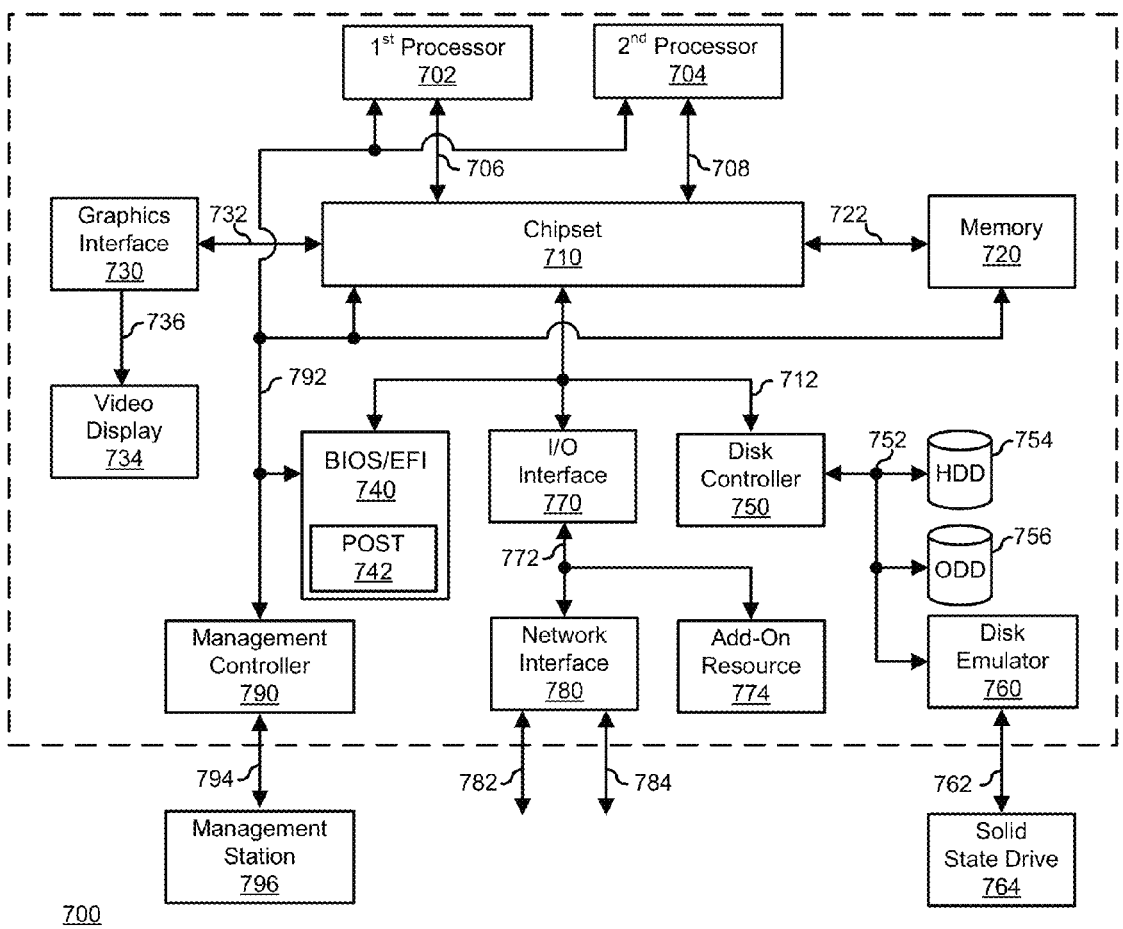
FIG. 7 is a block diagram illustrating an information handling system according to an embodiment of the present disclosure.

FIG. 7 illustrates an information handling system 700. For purpose of this disclosure a mobile electronic device can be implemented as an information handling system and may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, architecture, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

Information handling system 700 includes a processor 702 and one or more additional processors 704, a chipset 710, a memory 720, a graphics interface 730, include a basic input and output system/extensible firmware interface (BIOS/EFI) module 740, a disk controller 750, a disk emulator 760, an input/output (I/O) interface 770, a network interface 780, and a management controller (MC) 790. Processor 702 is connected to chipset 710 via processor interface 706, and processor 704 is connected to the chipset via processor interface 708. Memory 720 is connected to chipset 710 via a memory bus 722. Graphics interface 730 is connected to chipset 710 via a graphics interface 732, and provides a video display output 736 to a video display 734. In a particular embodiment, information handling system 700 includes separate memories that are dedicated to each of processors 702 and 704 via separate memory interfaces. An example of memory 720 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 740, disk controller 750, and I/O interface 770 are connected to chipset 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 710 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 740 includes BIOS/EFI code operable to detect resources within information handling system 700, to provide drivers for the resources, initialize the resources, and access the resources. BIOS/EFI module 740 includes code that operates to detect resources within information handling system 700, to provide drivers for the resources, to initialize the resources, and to access the resources.

Disk controller 750 includes a disk interface 752 that connects the disc controller to a hard disk drive (HDD) 754, to an optical disk drive (ODD) 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits a solid-state drive 764 to be coupled to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O interface 770 includes a peripheral interface 772 that connects the I/O interface to an add-on resource 774 and to network interface 780. Peripheral interface 772 can be the same type of interface as I/O channel 712, or can be a different type of interface. As such, I/O interface 770 extends the capacity of I/O channel 712 when peripheral interface 772 and the I/O channel are of the same type, and the I/O interface translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

In a particular embodiment, add-on resource 774 includes an option ROM (not illustrated). The option ROM is a firmware component supplied by the maker of add-on resource 774 and that operates to initialize and configure the add-on resource 774 during boot of information handling system 700. The option ROM extends the functionality of BIOS/EFI module 740 to incorporate the functionality of add-on resource 774 into information handling system 700. As such, the option ROM provides an interface between BIOS/EFI module 740 and add-on resource 774, permitting the BIOS/EFI module to implement functions specific to the add-on resource 774, such as power-on self test, interrupt service, or input/output service calls. The option ROM may be in memory 720, or in a memory of add-on resource 774.

Network interface 780 represents a NIC disposed within information handling system 700, on a main circuit board of the information handling system, integrated onto another component such as chipset 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be coupled to external network resources (not illustrated). The network resource can include another information handling system, a data storage system, another network, a grid management system, another suitable resource, or a combination thereof.

MC 790 is connected to processors 702 and 704, chipset 710, memory 720, and BIOS/EFI module 740 via a system communication bus 792. MC 790 may be on a main circuit board such as a baseboard, a motherboard, or a combination thereof), integrated onto another component such as chipset 710, in another suitable location, or a combination thereof. In a particular embodiment, one or more additional resources of information handling system 700, such as graphics interface 730, video display 734, I/O interface 770, disk controller 750, and network interface 780 are connected to MC 790. MC 790 can be part of an integrated circuit or a chip set within information handling system 700, and can be on a main circuit board, on separate circuit board or add-in card disposed within the information handling system, or a combination thereof. An example of MC 790 includes a baseboard management controller (BMC), an integrated Dell remote access controller (iDRAC), another controller, or a combination thereof. An example of system communication bus 792 includes an inter-integrated circuit ($I^2C$) bus, a system management bus (SMBus), a serial peripheral interface (SPI) bus, a low pin count (LPC) bus, another bus, or a combination thereof.

MC 790 is connected via a network channel 794 to a management station 796 that is external to information handling system 700. Management station 796 operates in conjunction with management controller 790 to provide out-of-band management of information handling system 700. Commands, communications, or other signals are communicated between MC 790 and management station 796 to monitor status of information handling system 700, to control the operations of the resources of the information handling system, and to update the resources. In a particular embodiment, MC 790 is powered by a separate power plane in information handling system 700, so that the MC can be operated while other portions of the information handling system are powered off. In another embodiment, MC 790 is operated during boot of information handling system 700).

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-transitory computer-readable medium including code for performing a method, the method comprising:
   providing a first keypad image to a display of a mobile device;
   determining, by a sensor of the mobile device, that a first motion level of the mobile device represents a still context for the mobile device;
   receiving, by the mobile device, a first touch pad input for a first character associated with the first keypad image in response to determining that the first motion level represents the still context;
   determining, by the sensor, that a second motion level of the mobile device represents a first moving context for the mobile device;
   receiving, by a touch pad adjuster of the mobile device, a second touch pad input, wherein the second touch pad input comprises a sequence of selections of a plurality of characters associated with the keypad image in response to determining that the second motion level represents the first moving context;
   averaging the sequence of selections; and
   providing, from the touch pad adjuster, a second character input to the mobile device in response to the averaging.

2. The computer-readable medium of claim 1, wherein the second character input is determined to indicate the second character based upon the sequence of selections including a larger number of touches to the second character than to any other character.

3. The computer-readable medium of claim 1, wherein the second character input is determined to indicate the second character based upon the sequence of selections having a longest average touch duration on the second character.

4. The computer readable medium of claim 1, wherein the characters include overlapping touch pad input areas.

5. The computer readable medium of claim 4, wherein the overlapping touch pad input areas provide for enlarged touch pad input areas for the characters.

6. The computer-readable medium of claim 1, the method further comprising:
displaying the characters as enlarged touch pad input areas.

7. A mobile device comprising:
a display operable to display a first keypad image;
a sensor operable to:
determine that a first motion level of the mobile device represents a still context for the mobile device; and
determine that a second motion level of the mobile device represents a moving context for the mobile device; and
a touch pad adjuster;
wherein the mobile device is operable to receive a first touch pad input for a first character associated with the first keypad image in response to determining that the first motion level represents the still context; and
wherein the touch pad adjuster is operable to:
receive a second touch pad input, wherein the second touch pad input comprises a sequence of selections of a plurality of characters associated with the keypad image in response to determining that the second motion level represents the first moving context;
average the sequence of selections; and
provide a second character input in response to the averaging.

8. The mobile device of claim 7, wherein the second character input is determined to indicate the second character based upon the sequence of selections including a larger number of touches to the second character than to any other character.

9. The mobile device of claim 7, wherein the second character input is determined to indicate the second character based upon the sequence of selections having a longest average touch duration on the second character.

10. The mobile device of claim 7, wherein the characters include overlapping touch pad input areas.

11. The mobile device of claim 10, wherein the overlapping touch pad input areas provide for enlarged touch pad input areas for the characters.

12. The mobile device of claim 7, wherein the characters are displayed as enlarged touch pad input areas.

13. A method comprising:
providing a first keypad image to a display of a mobile device;
determining, by a sensor of the mobile device, that a first motion level of the mobile device represents a still context for the mobile device;
receiving, by the mobile device, a first touch pad input for a first character associated with the first keypad image in response to determining that the first motion level represents the still context;
determining, by the sensor, that a second motion level of the mobile device represents a first moving context for the mobile device;
receiving, by a touch pad adjuster of the mobile device, a second touch pad input, wherein the second touch pad input comprises a sequence of selections of a plurality of characters associated with the keypad image in response to determining that the second motion level represents the first moving context;
averaging the sequence of selections; and
providing, from the touch pad adjuster, a second character input to the mobile device in response to the averaging.

14. The method of claim 13, wherein the second character input is determined to indicate the second character based upon the sequence of selections including a larger number of touches to the second character than to any other character.

15. The method of claim 13, wherein the second character input is determined to indicate the second character based upon the sequence of selections having a longest average touch duration on the second character.

16. The method of claim 13, wherein the characters include overlapping touch pad input areas.

17. The method of claim 16, wherein the overlapping touch pad input areas provide for enlarged touch pad input areas for the characters.

18. The method of claim 13, the method further comprising:
displaying the characters as enlarged touch pad input areas.

* * * * *